Patented Dec. 16, 1952

2,622,077

UNITED STATES PATENT OFFICE 2,622,077

CATALYTIC POLYMERIZATION WITH PINACOLONE PEROXIDE

Harold F. Park, East Longmeadow, and Henry A. Walter, Longmeadow, Mass., assignors to Monsanto Chemical Company, St. Louis, Mo., a corporation of Delaware No Drawing. Application December 6, 1950, Serial No. 199,549

2 Claims. (Cl. 260—93.5)

This invention relates to the polymerization of unsaturated organic compounds. More particularly, the invention relates to a new catalyst for the polymerization process.

The polymerization of most unsaturated organic compounds may be accomplished in the absence of catalysts at ordinary temperatures to yield polymers of extremely high molecular weight. Under these conditions, the process is extremely long and impractical. The reaction may be accelerated by raising the temperature and, in some cases, by using superatmospheric pressure. Under these conditions, the polymer is obtained more quickly but the molecular weight of the product decreases in proportion to the increase in temperature.

Many materials have been suggested for use as catalysts to increase the reaction rate without unduly lowering the molecular weight of the polymer formed. The known catalysts operate to reduce the polymerization time sufficiently to render the process of practical importance and they produce polymers which are sufficiently high in molecular weight to be useful for many purposes. However, most of the catalysts heretofore proposed leave an undesirable residue in the polymer which either during the reaction or later during storage and ageing causes discoloration of the polymeric material.

One object of this invention is to provide a new catalyst for the polymerization of unsaturated organic compounds.

A further object is to provide a catalyst which will markedly shorten the polymerization time without causing discoloration of the polymer or leaving a residue which will discolor the polymer on ageing.

These and other objects are attained by polymerizing unsaturated organic compounds in contact with catalytic amounts of pinacolone peroxide at temperatures above 100° C.

The following examples are given in illustration and are not intended as limitations of the scope of this invention. Where parts are mentioned, they are parts by weight.

Example I

Monomeric styrene was polymerized in a sealed vessel which had been evacuated to remove oxygen before sealing. The monomer contained 0.3 part of pinacolone peroxide per 100 parts of monomer. The sealed reaction vessel was heated at 150° C. for 60 minutes, then cooled, opened and the product removed. A tough water-white transparent polymer was obtained which, upon analysis, was found to contain less than 2% residual styrene monomer.

When the example was repeated omitting the catalyst, the polymer at the end of one hour at 150° C. contained more than 40% unreacted monomer and when benzoyl peroxide was substituted for the pinacolone peroxide, more than 15% monomer was unreacted.

By increasing the reaction time shown in Example I, to two hours, the residual monomer content could be reduced to less than 0.5%.

Example II

One hundred parts of monomeric styrene were mixed with 0.3 part of pinacolone peroxide. The mixture was heated at 120° C. under carefully controlled conditions to prevent temperature fluctuations either from an external source or from heat generated by the polymerization reaction. At the end of five hours, the reaction was more than 99.5% complete, i. e., the polymer produced contained less than 0.5% methanol soluble impurities including unreacted monomer. The polymer had a relatively high molecular weight and it was clear and colorless.

Pinacolone peroxide is a new compound which is disclosed and claimed in co-pending application Serial No. 199,550 filed December 6, 1950, now Patent No. 2,591,645 and may be prepared by reacting pinacol or pinacolone with hydrogen peroxide in an acid medium. It is an extremely efficient catalyst for obtaining rapid and substantially complete polymerization of unsaturated organic compounds at temperatures above 100° C. It may be used in amounts varying from 0.05 to 0.5 part per 100 parts of monomer and it may be used in conjunction with other catalysts such as the organic and inorganic per compounds.

Pinacolone peroxide promotes the polymerization and copolymerization of ethylenically unsaturated organic monomeric materials. The monomers may be olefins, diolefins, polyenes, vinylidene compounds, vinyl compounds, acrylic compounds, allylic compounds, butene dioic acid derivatives, etc.

Although the examples are restricted to the mass polymerization of styrene, the pinacolone peroxide is equally effective in emulsion and suspension polymerization systems to produce clear transparent polymers of relatively high molecular weight containing a minimum of unreacted monomer and other methanol soluble impurities.

The temperature and pressure of the polymerization reactions may be varied in accordance with the well-known requirements of the various polymerizable monomers. However, pinacolone peroxide is especially efficient at temperatures above 120° C. and has the property of providing polymers of relatively high molecular weight at such temperatures in a relatively short time and accompanied by substantially complete conversion of the monomer to polymer.

Variations may be made in the products and processes of this invention without departing from the spirit and scope thereof as defined in the appended claims.

What is claimed is:

1. A process which comprises polymerizing an ethylenically unsaturated organic monomer in contact with a catalytic amount of pinacolone peroxide at temperatures above 100° C.

2. A process which comprises polymerizing styrene in contact with a catalytic amount of pinacolone peroxide at temperatures above 100° C.

HAROLD F. PARK.
HENRY A. WALTER.

No references cited.